United States Patent
Ishida et al.

(10) Patent No.: US 12,345,689 B2
(45) Date of Patent: Jul. 1, 2025

(54) GAS COMPONENT DETECTION DEVICE WITH POISONING SUPPRESSION

(71) Applicant: Murata Manufacturing Co., Ltd., Nagaokakyo (JP)

(72) Inventors: Hideki Ishida, Nagaokakyo (JP); Takao Tsuda, Nisshin (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 260 days.

(21) Appl. No.: 18/060,253

(22) Filed: Nov. 30, 2022

(65) Prior Publication Data

US 2023/0094325 A1 Mar. 30, 2023

Related U.S. Application Data

(63) Continuation of application No. PCT/JP2021/021147, filed on Jun. 3, 2021.

(30) Foreign Application Priority Data

Jun. 3, 2020 (JP) .................................. 2020-096824

(51) Int. Cl.

| G01N 30/88 | (2006.01) |
|---|---|
| G01N 30/40 | (2006.01) |
| G01N 30/64 | (2006.01) |
| G01N 30/02 | (2006.01) |
| G01N 30/38 | (2006.01) |

(52) U.S. Cl.
CPC ............ *G01N 30/88* (2013.01); *G01N 30/40* (2013.01); *G01N 30/64* (2013.01); *G01N 2030/025* (2013.01); *G01N 2030/385* (2013.01); *G01N 2030/402* (2013.01); *G01N 2030/8804* (2013.01)

(58) Field of Classification Search
None
See application file for complete search history.

(56) References Cited

U.S. PATENT DOCUMENTS

2013/0171687 A1* 7/2013 Moularat ........... G01N 33/0047
435/287.7

FOREIGN PATENT DOCUMENTS

| JP | 2005-098817 A | 4/2005 |
|---|---|---|
| JP | 2005-221341 A | 8/2005 |

(Continued)

OTHER PUBLICATIONS

International Search Report for PCT/JP2021/021147 dated Aug. 17, 2021.

*Primary Examiner* — John E Breene
*Assistant Examiner* — Nigel H Plumb
(74) *Attorney, Agent, or Firm* — McDonald Hopkins LLC

(57) ABSTRACT

A gas component detection device includes a column, a sensor, a flow path, and a flow path switch. The column separates a component of gas to be detected. The sensor is, for example, a semiconductor sensor, is connected to the downstream side of the column, and detects a component of gas to be detected. The flow path connects the column and the sensor. The flow path switch is arranged between a flow path and a flow path. The flow path switch switches between and executes a measurement mode in which gas to be detected discharged from the column flows into the sensor, and a discharge mode in which gas to be detected discharged from the column is discharged to the outside.

20 Claims, 13 Drawing Sheets

(56) References Cited

FOREIGN PATENT DOCUMENTS

| | | | |
|---|---|---|---|
| JP | 2005221341 | * | 8/2005 |
| JP | 2005-315704 A | | 11/2005 |
| JP | 2005315704 | * | 11/2005 |
| JP | 2008-256714 A | | 10/2008 |
| JP | 2013-140154 A | | 7/2013 |
| JP | 2014-119403 A | | 6/2014 |

* cited by examiner

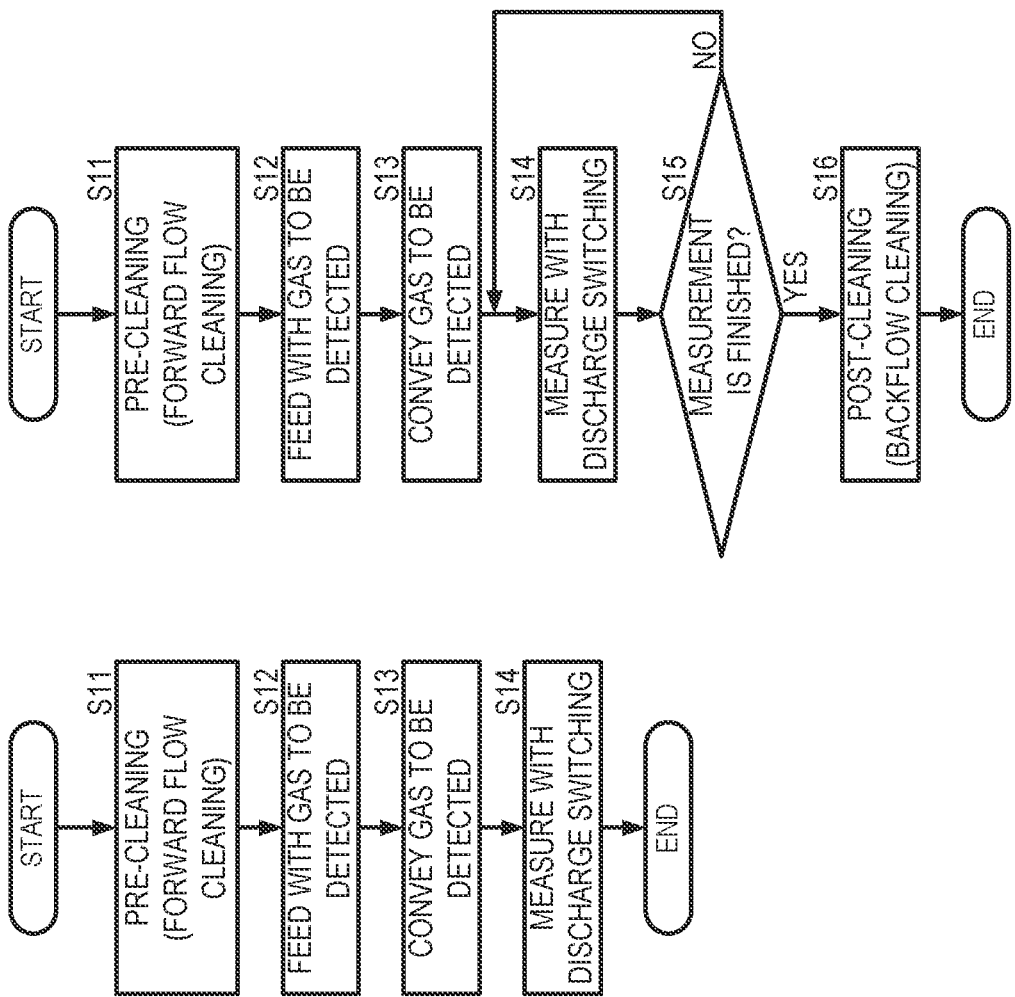
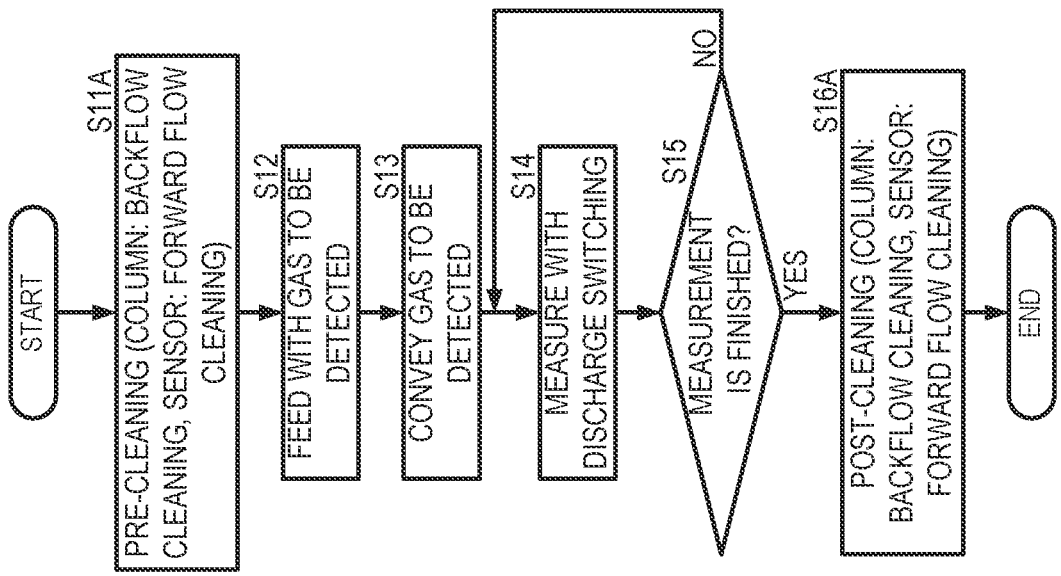
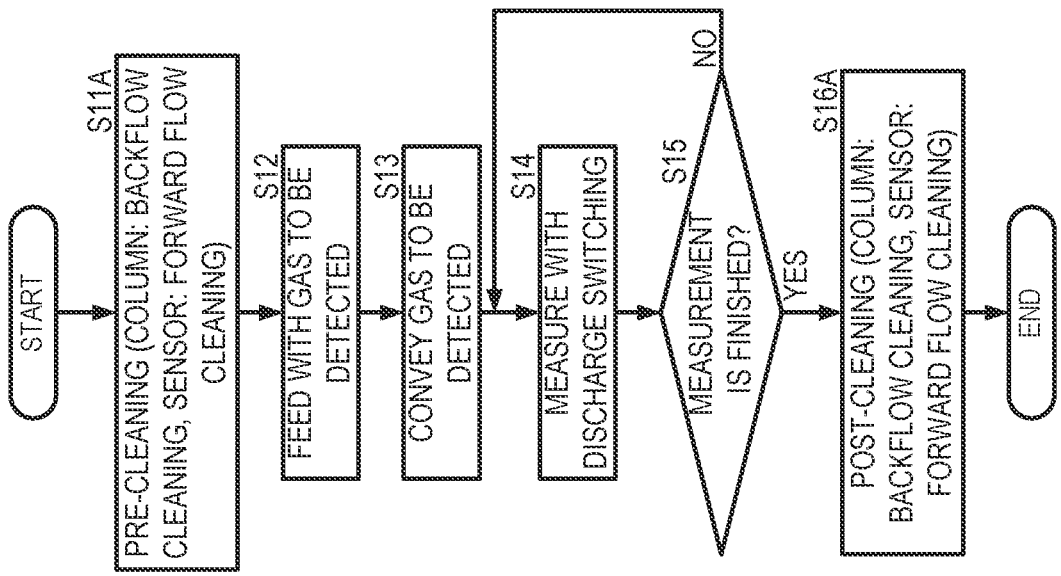

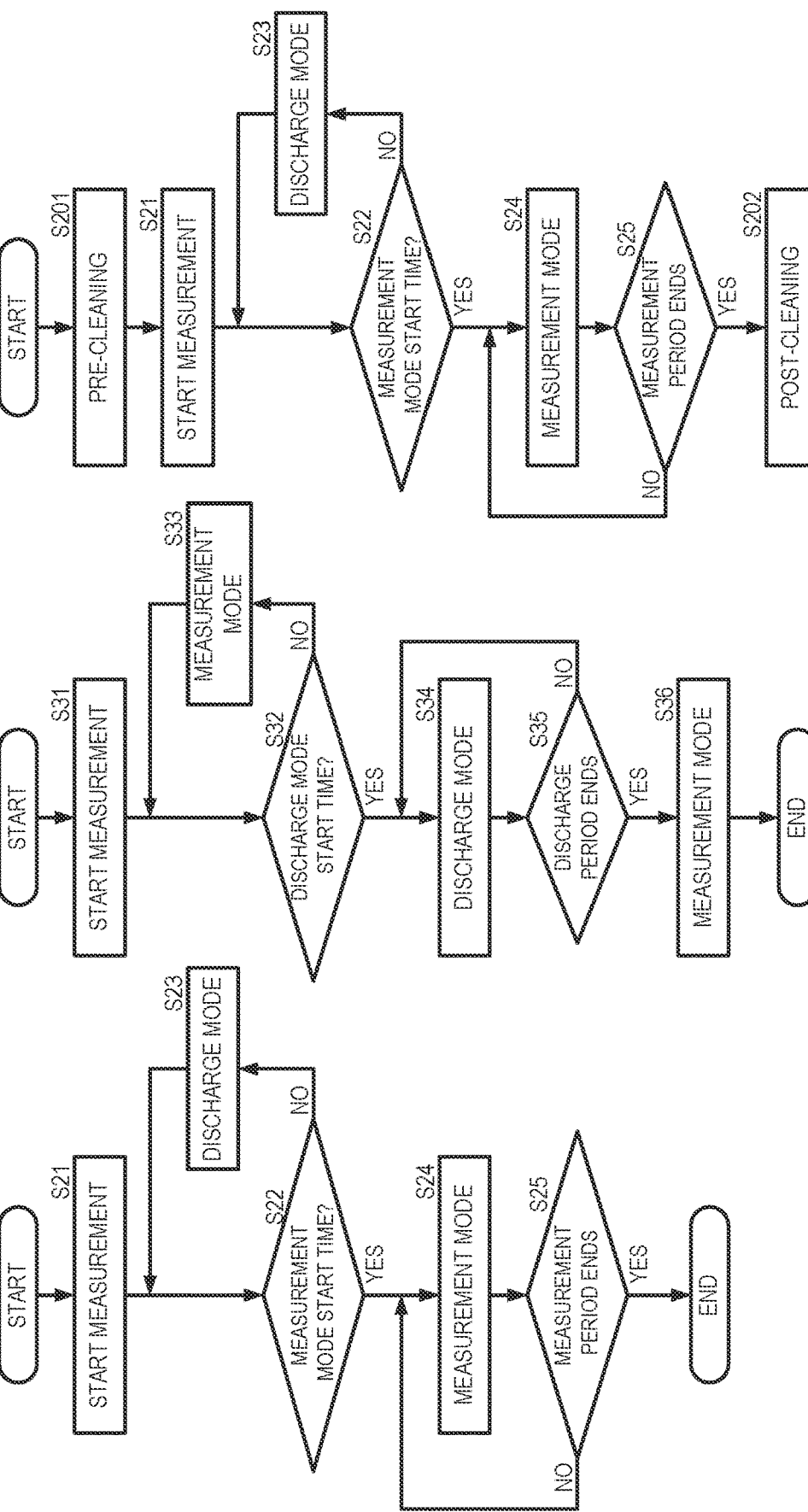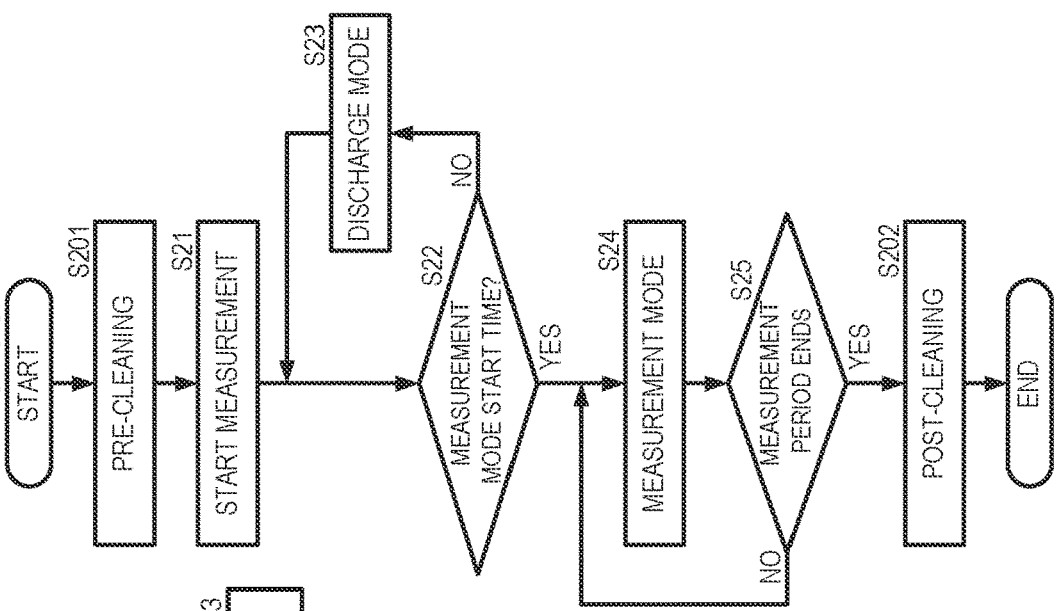

GAS COMPONENT DETECTION DEVICE WITH POISONING SUPPRESSION

CROSS REFERENCE TO RELATED APPLICATION

This is a continuation of International Application No. PCT/JP2021/021147 filed on Jun. 3, 2021 which claims priority from Japanese Patent Application No. 2020-096824 filed on Jun. 3, 2020. The contents of these applications are incorporated herein by reference in their entireties.

BACKGROUND OF THE DISCLOSURE

Field of the Disclosure

The present invention relates to a gas component detection device that detects a gas component using a gas chromatography technique.

Description of the Related Art

Currently, various devices (see, for example, Patent Literature 1) that detect a component using chromatography have been put into practical use. Then, gas chromatography is one type of chromatography. Gas chromatography detects a component contained in gas.

A gas component detection device using gas chromatography conveys gas to be detected by carrier gas and exposes the gas to be detected to a detector to detect a gas component.

(Patent Literature 1)

Japanese Patent Unexamined Publication No. 2008-256714 bulletin

BRIEF SUMMARY OF THE DISCLOSURE

However, in a case where a specific sensor such as a semiconductor sensor is used as a detector, if gas that poisons the sensor is contained together with gas to be detected (gas to be detected), the sensor is poisoned by the poisoning gas. When the sensor is poisoned, performance of the sensor deteriorates, such as deterioration of sensitivity.

Therefore, a possible benefit of the present invention is to provide a gas component detection device that suppresses poisoning of a sensor.

A gas component detection device of the present invention includes a column, a sensor, a downstream flow path, and a flow path switch. The column separates a component of gas to be detected. The sensor is connected downstream of the column and detects a component of gas to be detected. The downstream flow path connects the column and the sensor. The flow path switch is arranged in the downstream flow path. The flow path switch switches between and executes a measurement mode in which gas to be detected discharged from the column flows into the sensor, a discharge mode in which gas to be detected discharged from the column is discharged to the outside, and a backflow mode in which gas is caused to flow back from the downstream flow path so as to pass through the column so that the column is cleaned. The flow path switch includes a valve or a blower having a straightening function, and discharges gas to be detected to the outside as the valve or the blower is controlled by a control unit.

In this configuration, a poisoning component and a measurement target component in gas to be detected are separated by the column. The poisoning component is discharged to the outside in the discharge mode, and the measurement target component flows into the sensor in the measurement mode. This prevents the poisoning component from flowing into the sensor.

According to the present invention, poisoning of a sensor can be suppressed.

BRIEF DESCRIPTION OF THE SEVERAL VIEWS OF THE DRAWINGS

FIGS. 2A, 2B and 2C are flowcharts illustrating main operation of the gas component detection device.

FIG. 5A is a flowchart for executing switching of a flow path based on setting of a measurement mode (measurement period), FIG. 5B is a flowchart for executing switching of a flow path based on setting of a discharge mode (discharge period), and FIG. 5C is a flowchart including cleaning.

DETAILED DESCRIPTION OF THE DISCLOSURE

First Embodiment

Figure 1:
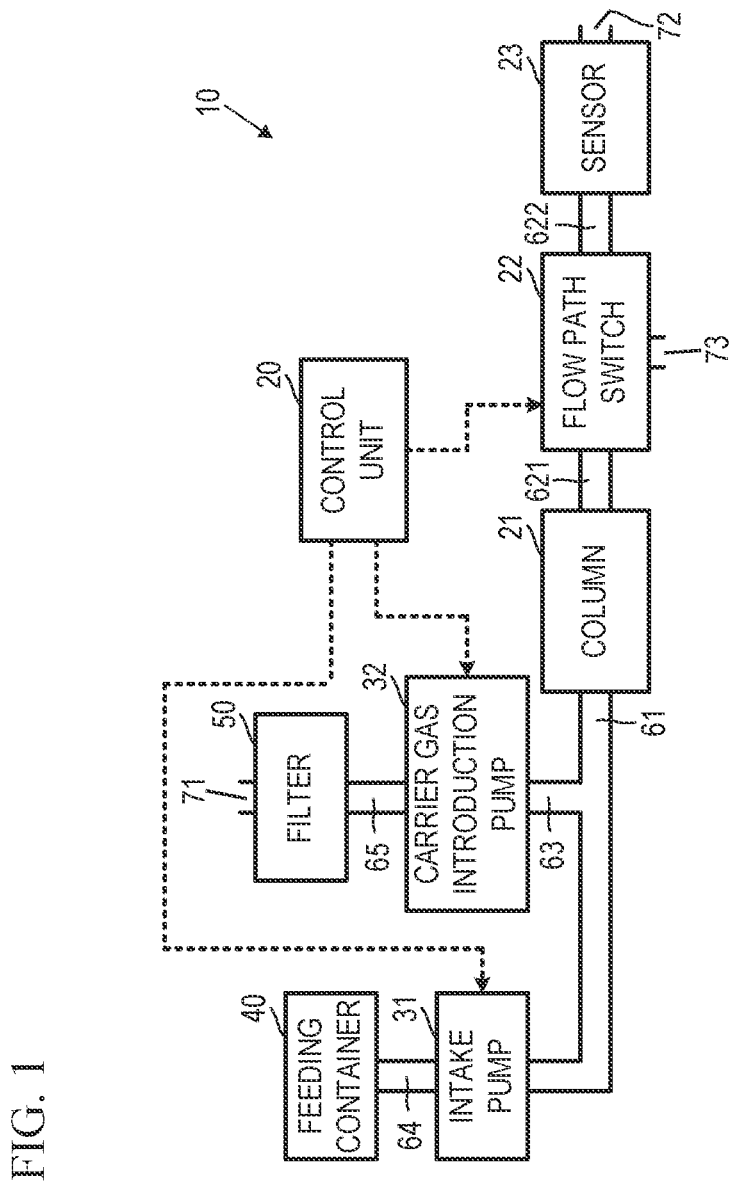
FIG. 1 is a diagram illustrating a configuration of a gas component detection device according to a first embodiment.

A gas component detection device according to a first embodiment of the present invention will be described with reference to the drawings. FIG. 1 is a diagram illustrating a configuration of the gas component detection device according to the first embodiment. Note that FIG. 1 schematically illustrates the gas component detection device using a functional block.

(Configuration of Gas Component Detection Device 10)

As illustrated in FIG. 1, a gas component detection device 10 includes a control unit 20, a column 21, a flow path switch 22, a sensor 23, an intake pump 31, a carrier gas introduction pump 32, a feeding container 40, and a filter 50. Further, the gas component detection device 10 includes a flow path 61, a flow path 621, a flow path 622, a flow path 63, a flow path 64, and a flow path 65.

The flow path 61, the flow path 621, the flow path 622, the flow path 63, the flow path 64, and the flow path 65 have a tubular shape in which a cross-sectional area (flow path cross-sectional area) of a plane orthogonal to the flow path is substantially constant. The flow path 621 and the flow path 622 constitute thee "downstream flow path" of the present invention.

The flow path 61 communicates with the column 21 and the intake pump 31. The flow path 621 communicates with the column 21 and the flow path switch 22. The flow path 622 communicates with the flow path switch 22 and the sensor 23. The sensor 23 communicates with an external space via an opening 72. Further, the flow path switch 22 communicates with an external space via an opening 73.

The flow path 63 communicates with the flow path 61 and the carrier gas introduction pump 32. The flow path 64 communicates with the intake pump 31 and the feeding container 40. The flow path 65 communicates with the carrier gas introduction pump 32 and the filter 50. The filter 50 communicates with an external space via an opening 71.

The control unit 20 is connected to the flow path switch 22, the intake pump 31, and the carrier gas introduction pump 32. The control unit 20 generates a control signal for controlling operation of the flow path switch 22, the intake pump 31, and the carrier gas introduction pump 32, and outputs the control signal to the flow path switch 22, the intake pump 31, and the carrier gas introduction pump 32. The flow path switch 22, the intake pump 31, and the carrier gas introduction pump 32 execute predetermined operation in accordance with the input control signal. Note that details of this control and operation will be described later.

The column 21 is tubular and includes an adsorbent or carrier in the inside. Further, a flow path cross-sectional area and a tube length of the column 21, a type of the adsorbent, a type of the carrier, that is, the specification of the column 21 is determined based on resolution of each component of gas to be detected and the like. According to a known concept, the column 21 decomposes each component of gas to be detected flowing in from the flow path 61 by making conveying time of each component different, and sends the components to the flow path 621.

The flow path switch 22 switches between a measurement mode and a discharge mode. Alternatively, the flow path switch 22 switches between the measurement mode, the discharge mode, and a backflow mode. In the measurement mode, the flow path switch 22 conveys gas from the flow path 621 toward the flow path 622. In the discharge mode, the flow path switch 22 conveys the gas from the flow path 621 toward the opening 73. In the backflow mode, the flow path switch 22 conveys gas from the opening 73 toward the flow path 621.

The sensor 23 includes, for example, a semiconductor sensor. Note that as to a type of the sensor, the sensor is not limited to a semiconductor sensor as long as the sensor has property of being poisoned by specific gas, and can be applied to the configuration of the present invention. The sensor 23 outputs voltage having intensity corresponding to concentration of each component of gas to be detected as a measurement signal. A component contained in gas to be detected can be detected based on the measurement signal.

The feeding container 40 stores gas to be detected such as exhalation. The feeding container 40 is a detachable container. The intake pump 31 sucks gas to be detected from the feeding container 40 through the flow path 64 and sends the gas to be detected to the flow path 61.

The filter 50 is a gas cleaning filter, and filters off impurities such as dust and fine particles contained in the air, for example. The filtered gas becomes carrier gas for gas chromatography. The carrier gas introduction pump 32 sucks carrier gas output from the filter 50 through the flow path 65 and sends the carrier gas to the flow path 61 through the flow path 63. At this time, similarly to the specification of the column 21, the carrier gas introduction pump 32 determines a flow rate so that resolution of a component of gas to be detected has desired performance.

(Method of Conveying Gas to be Detected and Detecting Component in Gas Component Detection Device 10)

FIGS. 2A, 2B, and 2C are flowcharts illustrating main operation of the gas component detection device. FIG. 2A illustrates a case where measurement and discharge are executed, FIG. 2B illustrates a case where measurement, discharge, and backflow are executed, and FIG. 2C illustrates another main operation including cleaning.

FIGS. 3A, 3B, 3C, 4A, and 4B are diagrams illustrating flow of gas during each operation.

(Case of Executing Measurement and Discharge: See FIG. 2A)

Pre-Cleaning (Forward Flow Cleaning)

The gas component detection device 10 executes pre-cleaning (forward flow cleaning) (S11). In the pre-cleaning, the control unit 20 stops the intake pump 31 and operates the carrier gas introduction pump 32. Further, the control unit 20 causes the flow path switch 22 to have a mode similar to the measurement mode.

Figure 3A:
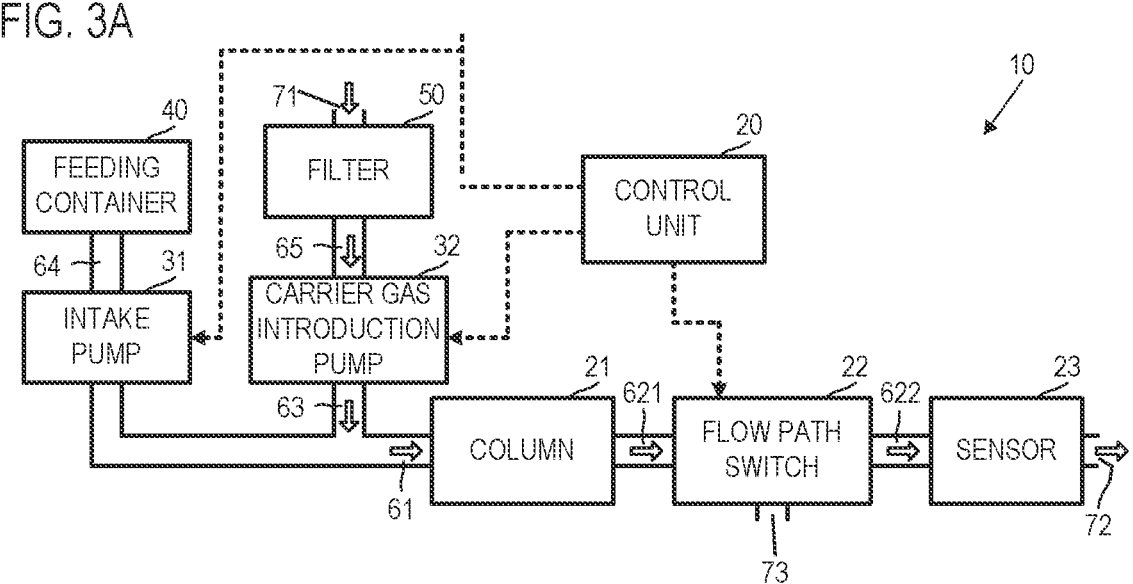
FIGS. 3A, 3B, and 3C are diagrams illustrating flow of gas during each operation.

By the above, as illustrated in FIG. 3A, carrier gas generated by the filter 50 is sent into the column 21 through the carrier gas introduction pump 32, the flow path 65, and the flow path 61. Note that the intake pump 31 is provided with a valve, and the control unit 20 closes the valve at the time of pre-cleaning. By the above, communication between the flow path 61 and the flow path 64 (feeding container 40) is blocked.

Carrier gas that passes through the column 21 is inserted into the flow path switch 22 through the flow path 621. Similarly to the measurement mode, the flow path switch 22 communicates the flow path 621 and the flow path 622. By the above, the carrier gas is sent out to the outside through the flow path 622, the sensor 23, and the opening 72.

With such operation, carrier gas flows in a forward direction of a flow path for measurement, and the column 21 and the sensor 23 are cleaned by the carrier gas. Furthermore, the flow path 61, the flow path 621, the flow path 622, and the flow path switch 22 are also cleaned. By the above, poisoning of the sensor 23 by a residual component is suppressed. Further, an error due to a residual component in new measurement is suppressed. Note that although the pre-cleaning can be omitted, the pre-cleaning is preferably performed for these reasons.

Feeding with Gas to be Detected

The gas component detection device 10 performs feeding with gas to be detected (S12). In feeding with gas to be detected, the control unit 20 operates the intake pump 31 and stops the carrier gas introduction pump 32.

Figure 3B:
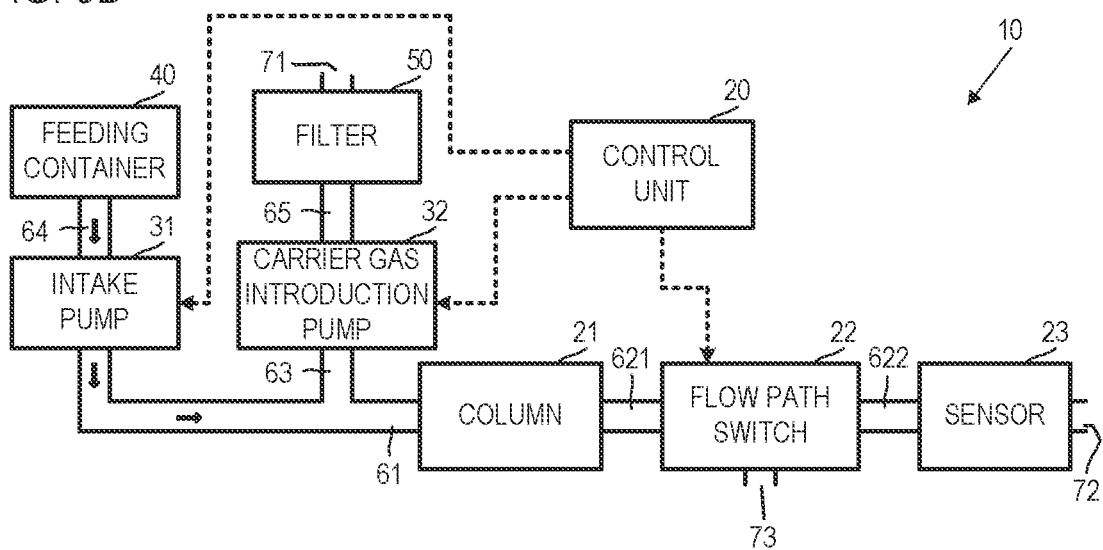

By the above, as illustrated in FIG. 3B, gas to be detected contained in the feeding container 40 is fed into the flow path 61 through the flow path 64 and the intake pump 31.
Conveyance of Gas to be Detected The gas component detection device 10 conveys gas to be detected so as to send the gas to be detected into the column 21 (S13). In the conveyance of gas to be detected, the control unit 20 operates the carrier gas introduction pump 32.

Figure 3C:
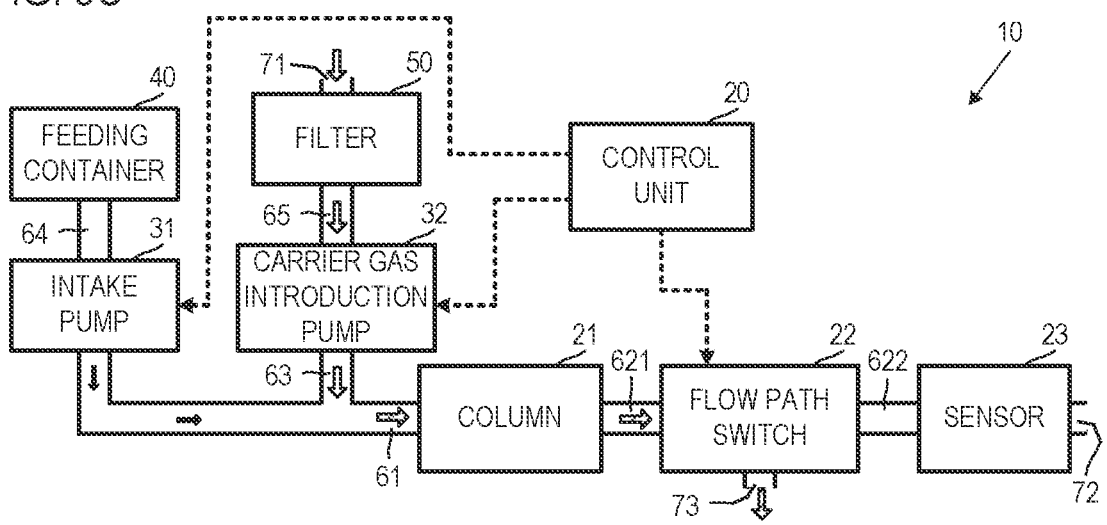
Figure 4A:
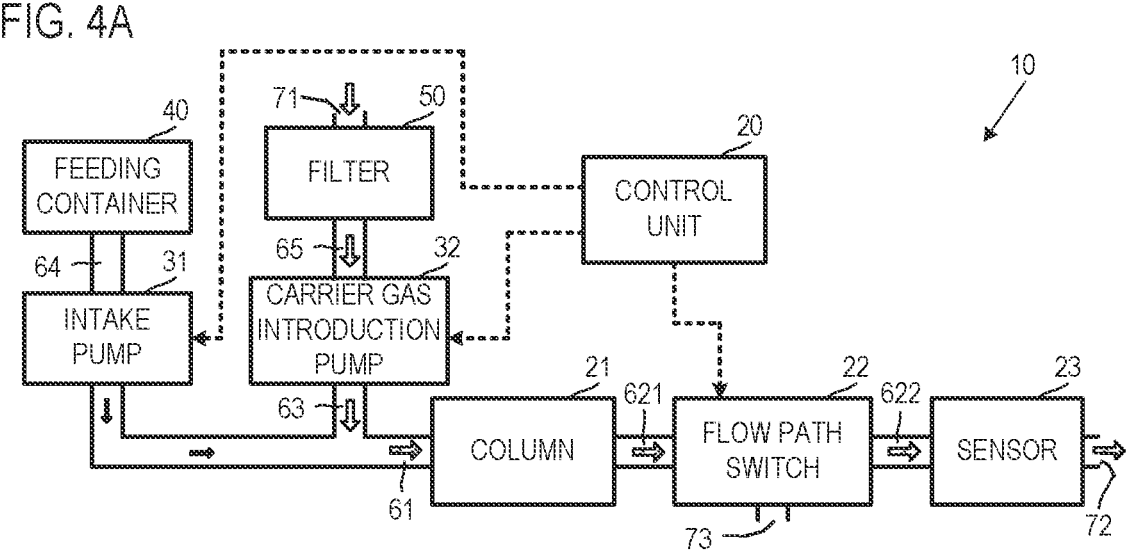
FIGS. 4A and 4B are diagrams illustrating flow of gas during each operation.

By the above, as illustrated in FIGS. 3C and 4A, gas to be detected fed into the flow path 61 is mixed with carrier gas and inserted into the column 21.
Measurement with Discharge Switching The gas component detection device 10 switches between and executes measurement of a component of gas to be detected sent out from the column 21 and discharge of gas to be detected sent out from the column 21 based on a preset condition (S14). In measurement with discharge switching, the control unit 20 operates the carrier gas introduction pump 32. Further, the control unit 20 operates the flow path switch 22 to switch between the measurement mode and the discharge mode.

In the discharge mode, as illustrated in FIG. 3C, gas to be detected sent out from the column 21 is discharged from the opening 73 through the flow path 621 and the flow path switch 22. The discharge mode is executed during a period (discharge period) in which a component that poisons the sensor 23 in the gas to be detected, that is, a component unnecessary for measurement is conveyed. Examples of the poisoning component include siloxane, chlorine gas, sulfurization gas, methyl mercaptan, and Freon gas.

In the measurement mode, as illustrated in FIG. 4A, gas to be detected sent out from the column 21 is sent into the sensor 23 through the flow path 621, the flow path switch 22, and the flow path 622. The measurement mode is executed during a period (measurement period) in which a component to be measured in gas to be detected is conveyed. The component to be measured is, for example, acetone.

Here, as described above, each component in gas to be detected is difference in time (conveyance time) to pass through the column 21 is different. Therefore, there is a difference in time during which a plurality of components are output from the column 21. For this reason, there is also a difference in time during which each component is sent into the flow path switch 22. By using this, a discharge period and a measurement period can be set separately.

By executing such processing, the gas component detection device 10 can measure a component to be measured with the sensor 23, suppress poisoning or the like of the sensor 23 due to an unnecessary component such as a poisoning component, and suppress performance deterioration of the sensor 23.
(Case of Executing Measurement, Discharge, and Backflow: See FIG. 2B)

A mode in which backflow is executed is different from the mode in which the measurement and the discharge are executed described above in that a mode in which backflow is executed is further added. The measurement mode and the discharge mode are similar to those in the above-described case illustrated in FIG. 2A, and description of the modes will be omitted.

When the measurement is finished (S15: YES), the gas component detection device 10 executes post-cleaning (backflow cleaning) which is a backflow mode (S16). Note that when predetermined measurement (for example, a predetermined number of times of measurement) is not finished (S15: NO), the measurement with discharge switching is continued.

The gas component detection device 10 executes post-cleaning (backflow cleaning) (S16). In the post-cleaning (backflow cleaning), the control unit 20 stops the intake pump 31 and the carrier gas introduction pump 32. Note that the carrier gas introduction pump 32 is provided with a valve, and the control unit 20 closes the valve at the time of post-cleaning. This blocks communication between flow path 63 and flow path 65 (filter 50).

The control unit 20 operates the flow path switch 22 in the backflow mode. In the backflow mode, the flow path switch 22 sucks gas from the opening 73 and sends the gas to the flow path 621. Further, the flow path switch 22 blocks communication between the opening 73 and the flow path 622.

Figure 4B:
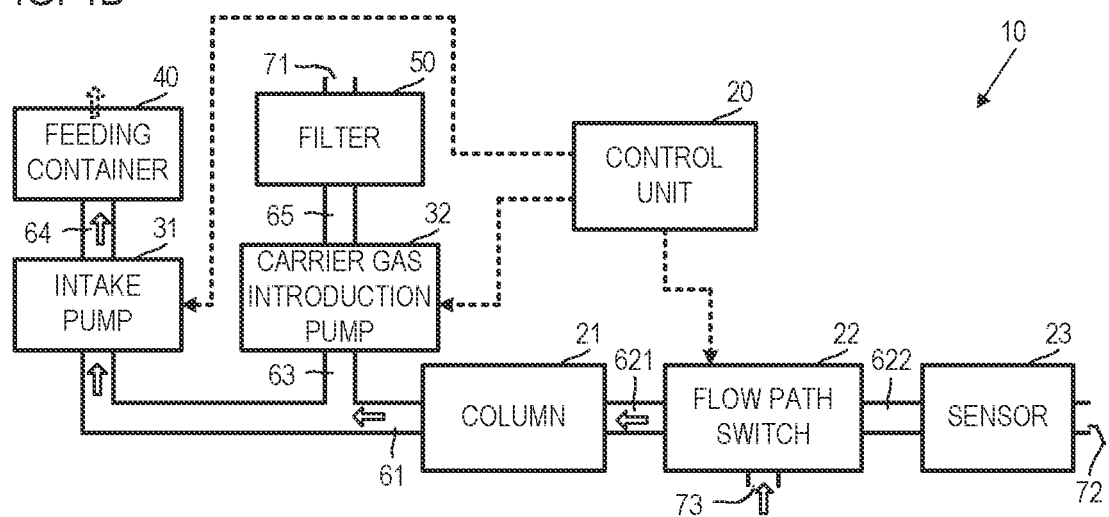

In the backflow mode, as illustrated in FIG. 4B, gas (outside air) sucked through the opening 73 is sent into the column 21 through the flow path switch 22 and the flow path 621. Furthermore, the gas is sent into the feeding container 40 through the column 21, the flow path 61, the intake pump 31, and the flow path 64, and discharged from the feeding container 40 to the outside. By the above, the flow path 621, the column 21, the flow path 61, the intake pump 31, the flow path 64, and the feeding container 40 are cleaned by outside air. As a result, adverse effects such as poisoning of the sensor 23 and an increase in measurement error at the time of next measurement due to a residual component are suppressed. Note that the feeding container 40 may be cleaned by a separately prepared flow path instead of gas (outside air) sucked from the opening 73. In this case, a mechanism (for example, a flow path switch different from the flow path switch 22) for introducing clean air into feeding container 40 is directly connected.

Note that in such post-cleaning, at least the column 21 only needs to be cleaned. Therefore, if only the column 21 is to be cleaned, a discharge valve is preferably installed in the middle of the flow path 61. In this case, the discharge valve of the flow path 61 may be in a blocked state in the measurement mode and the discharge mode, and may be in an open state in the backflow mode.
(Case of Executing Another Type of Cleaning: See FIG. 2C)

Operation (processing process) illustrated in FIG. 2C is different from the operation (processing process) illustrated in FIG. 2B in a column cleaning direction. The other operations are the same as those in FIG. 2B, and description of similar portions will be omitted.
(Pre-Cleaning)

The gas component detection device 10 executes pre-cleaning (S11A). This pre-cleaning is backflow cleaning of the column 21 and forward flow cleaning of the sensor 23. More specifically, the control unit 20 operates the flow path switch 22 in the backflow mode. In this case, the intake pump 31 is configured to be capable of bidirectional gas conveyance. Then, the control unit 20 controls the intake pump 31 to be in a discharge mode, that is, to convey gas from the flow path 61 to the flow path 64. By the above, backflow cleaning of the column is realized.

Further, the control unit 20 causes the opening 73 and the flow path 622 to communicate with each other by the flow path switch 22. At this time, a backflow prevention valve is installed in the flow path switch 22 or the flow path 621, and the control unit 20 closes the backflow prevention valve. Gas (outside air) sucked through the opening 73 is inserted into the sensor 23 through the flow path 622, and is sent out from the sensor 23 to the opening 72. By the above, forward flow cleaning of the sensor 23 is realized.

By performing such pre-cleaning including backflow cleaning of the column 21, gas (for example, miscellaneous gas) remaining in the column 21 by past measurement or the like can be effectively eliminated without sending the gas to the sensor 23. In particular, remaining gas trapped in a liquid phase constituting the column 21 tends to be stored near an inlet of the column 21 (on the flow path 61 side). Therefore, by performing the backflow cleaning, gas remaining in the column 21 can be discharged more effectively.

(Post-Cleaning)

After measurement is finished, the gas component detection device 10 executes post-cleaning (S16A). The post-cleaning in Step S16A is similar to the pre-cleaning in Step S11A described above.

(Specific Example of Method of Controlling Measurement Mode and Discharge Mode)

In order to execute the switching of a flow path described above, units including the control unit 20 in the gas component detection device 10 execute control described below. Note that, hereinafter, a mode in which various types of control are executed by the control unit 20 will be described, but it is also possible to execute control by each unit (the flow path switch 22, the intake pump 31, and the carrier gas introduction pump 32) of the gas component detection device 10 individually including a control unit and transmitting and receiving control data between the control units.

Figure 6A:
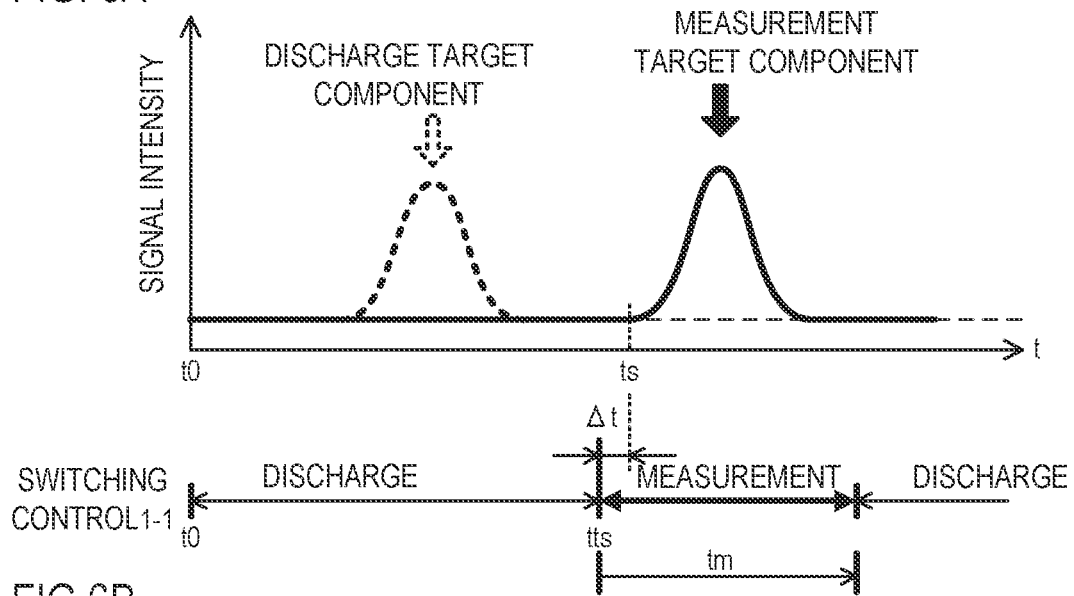
FIG. 6A is a diagram illustrating a concept of executing switching of a flow path based on setting of the measurement mode (measurement period)
Figure 6B:
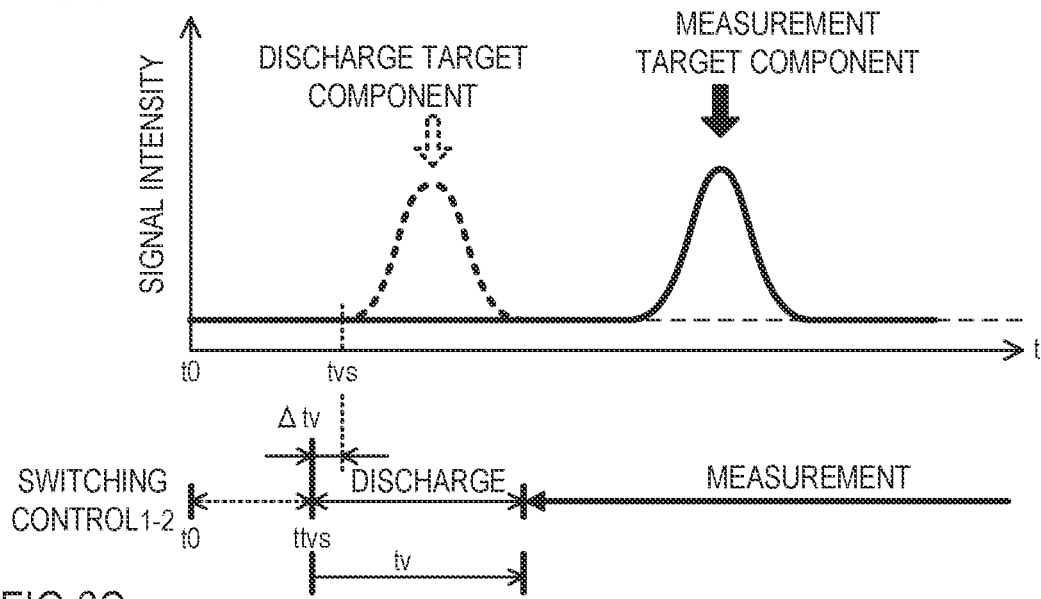
FIG. 6B is a diagram illustrating a concept of executing switching of a flow path based on setting of the discharge mode (discharge period)
Figure 6C:
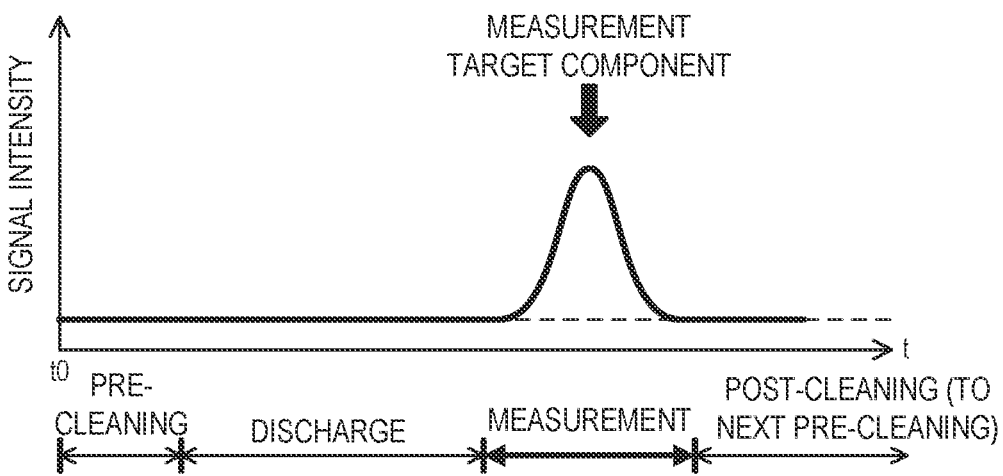
FIG. 6C is a diagram illustrating an example of a gas chromatograph in a mode in which measurement is performed while flow path switching is performed.

FIG. 5A is a flowchart for executing switching of a flow path based on setting of the measurement mode (measurement period), and FIG. 5B is a flowchart for executing switching of a flow path based on setting of the discharge mode (discharge period). FIG. 5C is a flowchart including cleaning. FIG. 6A is a diagram illustrating a concept of executing switching of a flow path based on setting of the measurement mode (measurement period), and FIG. 6B is a diagram illustrating a concept of executing switching of a flow path based on setting of the discharge mode (discharge period). FIG. 6C is a diagram illustrating an example of a gas chromatograph in a mode in which measurement is performed while flow path switching is performed. Note that, as illustrated in FIGS. 6A and 6B, components (discharge target components) input to the sensor are indicated by a broken line unless the configuration and processing of the present application are used. Hereinafter, also in FIGS. 7A, 7B, 8, and 9, components (discharge target components) input to the sensor are indicated by a broken line unless the configuration and processing of the present application are used.

(Measurement Mode Standard: See FIGS. 5A and 6A)

When receiving a trigger for starting measurement, the control unit 20 starts measurement of a component of gas to be detected (S21). The trigger for starting measurement is, for example, input of user operation.

The control unit 20 starts operation of the carrier gas introduction pump 32 together with start of measurement. By the above, gas to be detected is sent into the column 21 together with carrier gas. The control unit 20 starts clocking at start of measurement, that is, at a start time of introduction of carrier gas by the carrier gas introduction pump 32.

The control unit 20 controls operation of the flow path switch 22 so as to execute the exhaust mode until measurement mode start time (S22: NO) (S23).

When the measurement mode start time comes (S22: YES), the control unit 20 controls operation of the flow path switch 22 to execute the measurement mode (S24).

The control unit 20 maintains the measurement mode until the time until which the measurement mode is continued (end time of a measurement period) (S25: NO).

When the end time of a measurement period comes (S25: YES), the control unit 20 ends the measurement mode.

Such control enables selective component detection as illustrated in FIG. 6A.

First, measurement mode start time tts is measured based on an introduction start time to of carrier gas. As described above, depending on the specification of the column 21 and a flow rate of the carrier gas introduction pump 32, time at which each component of gas to be detected is sent out from the column 21 and time at which each component is introduced into the sensor 23 can be estimated. Therefore, the measurement mode start time tts can be set based on introduction start time ts at which a measurement target component is assumed to be introduced into the sensor 23. For example, time obtained by subtracting margin time Δt for various errors in temperature and the like from the introduction start time ts is set as the measurement mode start time tts.

Further, a time length tm in which a spectrum waveform of a measurement target component appears can also be estimated based on the specification of the column 21 and a flow rate of the carrier gas introduction pump 32.

Therefore, the measurement period can be set based on the measurement mode start time tts and the time length tm.

Then, this period is controlled to the measurement mode, and the other periods are controlled to the discharge mode. By the above, the sensor 23 can measure only a measurement target component, and it is possible to prevent the sensor 23 from being exposed by a discharge target component.

(Discharge Mode Standard: See FIGS. 5B and 6B)

When receiving a trigger for starting measurement, the control unit 20 starts measurement of a component of gas to be detected (S31). The trigger for starting measurement is, for example, input of user operation.

The control unit 20 starts operation of the carrier gas introduction pump 32 together with start of measurement. By the above, gas to be detected is sent into the column 21 together with carrier gas. The control unit 20 starts clocking at start of measurement, that is, at a start time of introduction of carrier gas by the carrier gas introduction pump 32.

The control unit 20 waits until discharge mode start time (S32: NO). When the discharge mode start time comes (S32: YES), the control unit 20 controls operation of the flow path switch 22 to execute the discharge mode (S33).

The control unit 20 maintains the discharge mode until the time until when the discharge mode is continued (end time of a discharge period) (S34: NO).

When the end time of a discharge period comes (S34: YES), the control unit 20 ends the discharge mode and switches to the measurement mode (S35).

Such control enables selective component detection as illustrated in FIG. 6B.

First, discharge mode start time ttvs is timed based on the introduction start time to of carrier gas. As described above, depending on the specification of the column 21 and a flow rate of the carrier gas introduction pump 32, time at which each component of gas to be detected is sent out from the column 21 and time at which each component is introduced into the sensor 23 can be estimated. Therefore, the discharge mode start time ttvs can be set based on introduction start time tvs at which a discharge target component is assumed to be introduced into the sensor 23. For example, time obtained by subtracting margin time Δtv for various errors in temperature and the like from the introduction start time tvs is set as the discharge mode start time ttvs.

Further, a time length tv in which a signal waveform of a discharge target component appears can also be estimated based on the specification of the column 21 and a flow rate of the carrier gas introduction pump 32.

Therefore, the discharge period can be set based on the discharge mode start time ttvs and the time length tv.

Then, this period is controlled to the discharge mode, and the other periods are controlled to the measurement mode. By the above, the sensor 23 can measure only a measurement target component while preventing the sensor 23 from being exposed by a discharge target component.

(Case of Performing Cleaning: See FIGS. 5C and 6C)

Processing illustrated in FIGS. 5C and 6C is different from the processing illustrated in FIGS. 5A and 6A in that pre-cleaning and post-cleaning are further added. The other processing is similar, and is omitted from detailed description except for necessary portions.

The control unit 20 always performs backflow cleaning of the column 21 before a measurement trigger starts (S201). At this time, the control unit 20 performs forward flow cleaning on the sensor 23. When a trigger for starting measurement is received, measurement of a component of gas to be detected is started (S21). The trigger for starting measurement is, for example, input of user operation.

As measurement is started, the control unit 20 sends gas in the feeding container to the column 21 using the intake pump 31. When a predetermined amount of gas is sent into the column, the control unit 20 stops the intake pump 31 and starts operation of the carrier gas introduction pump 32. The predetermined amount of gas is controlled based on a flow rate and time. By the above, gas to be detected is sent into the column 21 together with carrier gas. The control unit 20 starts clocking at start of measurement, that is, at a start time of introduction of carrier gas by the carrier gas introduction pump 32.

The control unit 20 controls operation of the flow path switch 22 so as to execute the exhaust mode until measurement mode start time (S22: NO) (S23).

When the measurement mode start time comes (S22: YES), the control unit 20 controls operation of the flow path switch 22 to execute the measurement mode (S24).

The control unit 20 maintains the measurement mode until the time until which the measurement mode is continued (end time of a measurement period) (S25: NO).

When the end time of a measurement period comes (S25: YES), the control unit 20 ends the measurement mode.

After the measurement period ends, the control unit 20 controls the flow path switch 22 to perform backflow cleaning of the column 21 and forward flow cleaning of the sensor 23, and maintains the state until next measurement (S202). That is, the post-cleaning in Step S202 leads to the pre-cleaning in Step S201 described above.

(Measurement of Plurality of Measurement Target Components)

Figure 7A:
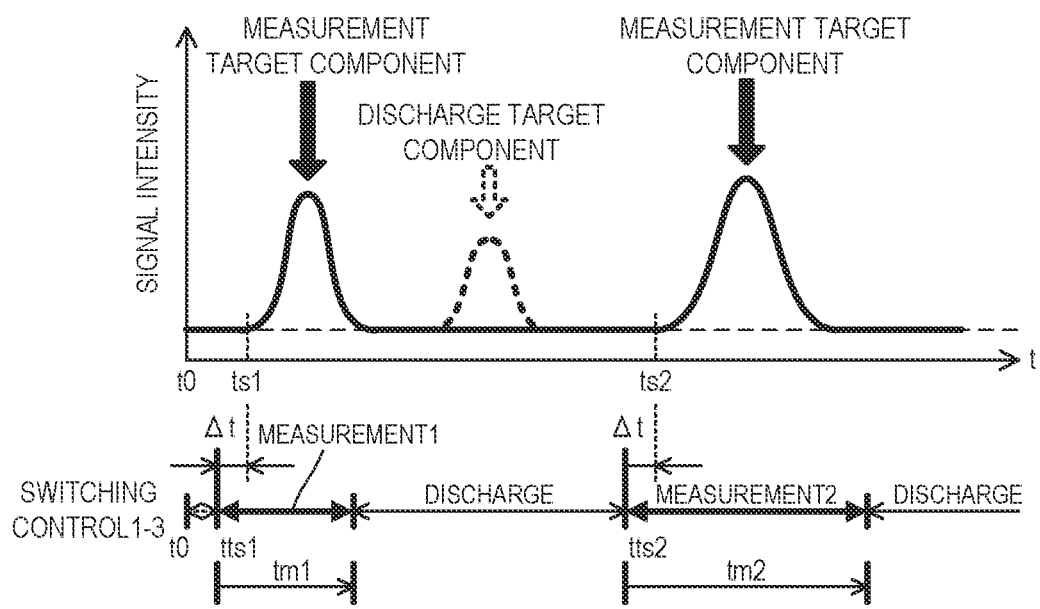
FIG. 7A is a diagram illustrating a concept of executing switching of a flow path based on setting of a plurality of the measurement modes (measurement periods)

In the above description, the case of measuring one type of measurement target component is described, but a discharge target component can be discharged while a plurality of types of measurement target components are measured. FIG. 7A is a diagram illustrating a concept of executing switching of a flow path based on setting of a plurality of the measurement modes (measurement periods). Note that, as basic control, even in a case of a plurality of types, control in a case of one type can be applied, and thus detailed description of the control will be omitted.

In a case where a plurality of types of measurement target components are measured, measurement mode start time and a time length of a measurement period are preferably set for each measurement target component. Specifically, in a case of FIG. 7A, introduction start time ts1 is estimated for a first measurement target component, and measurement mode start time tts1 is set from the introduction start time ts1. Further, a time length tm1 of a measurement period is also set for the first measurement target component. Similarly, introduction start time ts2 is estimated for a second measurement target component, and measurement mode start time tts2 is set from the introduction start time ts2. Further, a time length tm2 of a measurement period is also set for the second measurement target component.

Then, a plurality of the measurement modes set as described above are executed, and the discharge mode is executed for a time zone other than that of a plurality of the measurement modes. By the above, the gas component detection device 10 can prevent the sensor 23 from being exposed by a discharge mode component while measuring a plurality of types of measurement target components.

(Discharge of Plurality of Discharge Target Components)

Figure 7B:
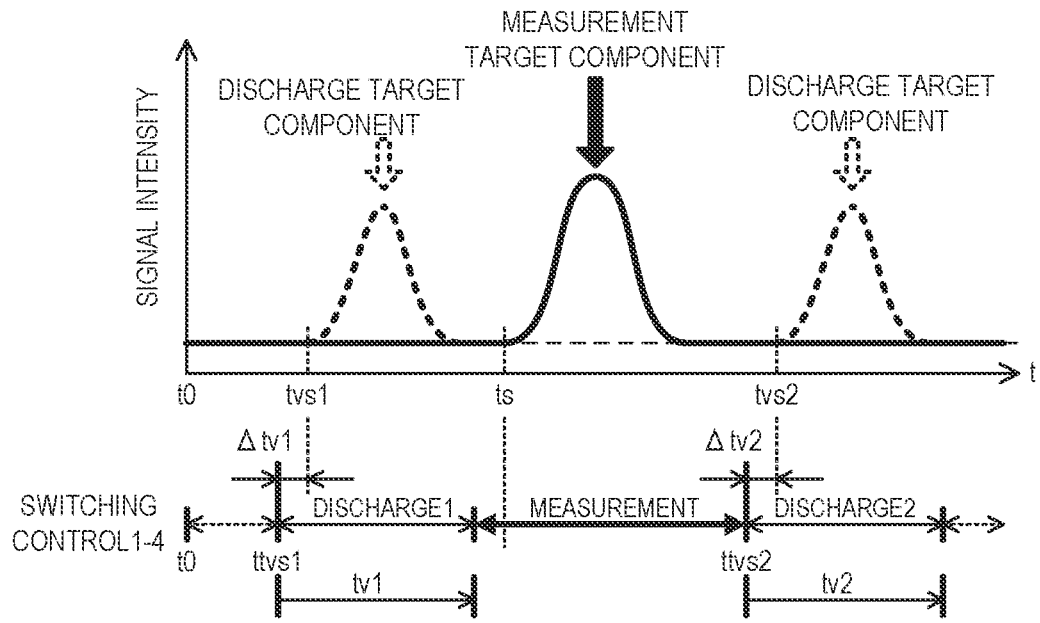
FIG. 7B is a diagram illustrating a concept of executing switching of a flow path based on setting of a plurality of the discharge modes (discharge periods).

FIG. 7B is a diagram illustrating a concept of executing switching of a flow path based on setting of a plurality of discharge modes (discharge periods). Note that, as basic control, even in a case of a plurality of types, control in a case of one type can be applied, and thus detailed description of the control will be omitted.

When a plurality of types of discharge target components are measured, discharge mode start time and a time length of a discharge period are preferably set for each discharge target component. Specifically, in a case of FIG. 7B, introduction start time tvs1 is estimated for a first discharge target component, and discharge mode start time ttvs1 is set from the introduction start time tvs1. Further, a time length tv1 of a discharge period is also set for the first discharge target component. Similarly, introduction start time tvs2 is estimated for a second discharge target component, and discharge mode start time ttvs2 is set from the introduction start time tvs2. Further, a time length tv2 of a discharge period is also set for the second discharge target component.

Then, a plurality of the discharge modes set as described above are executed, and the measurement mode is executed for a time zone other than that of a plurality of the discharge modes. By the above, the gas component detection device 10 can measure a plurality of types of measurement target components while preventing the sensor 23 from being exposed by a discharge mode component.

(Case where Signals of Measurement Target Component and Discharge Target Component are Close to Each Other)

Figure 8:
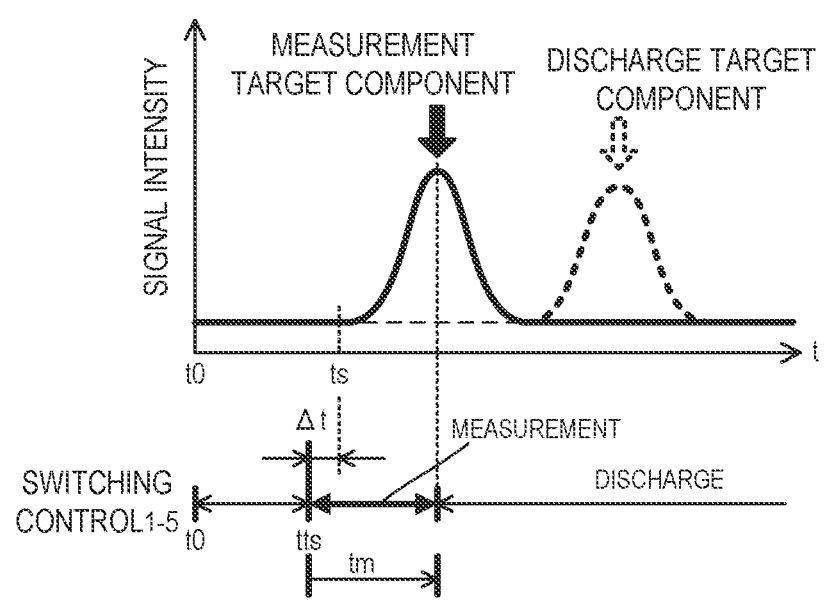
FIG. 8 is a diagram illustrating a concept of executing switching of a flow path in a case where a signal of a measurement target component and a signal of a discharge target component are close to each other.

FIG. 8 is a diagram illustrating a concept of executing switching of a flow path in a case where a signal of a measurement target component and a signal of a discharge target component are close to each other, in other words, time when a measurement target component is generated and time when the discharge target component is generated are close to each other.

Note that, as basic control, control in a case where a signal of a measurement target component and a signal of a discharge target component are separated can be applied, and thus detailed description of the control will be omitted.

In a case where a signal of a measurement target component and a signal of a discharge target component are close to each other, if a time length of a measurement period is too long, the signal of the discharge target component appears during the measurement period.

In view of the above, the control unit 20 of the gas component detection device 10 sets the time length tm of a measurement period to be shorter than a time length in which a signal of a measurement target component appears. For example, as illustrated in FIG. 8, the time length tm of a measurement period is set to approximately ½ of the entire time length of a signal of a measurement target component.

By the above, it is possible to suppress appearance of a signal of a discharge target component within a measurement period. Note that, in this case, the sensor 23 can measure only a part of a signal of a measurement target component, but since a change rate of a signal and concentration of a measurement target component have a unique relationship, concentration of a measurement target component can be accurately measured even in this case.

Therefore, even if a signal of a measurement target component and a signal of a discharge target component are close to each other, the gas component detection device 10 can more reliably measure the measurement target component and suppress the sensor 23 from being exposed by the discharge target component.

(Case of Executing Backflow Mode (Cleaning Mode))

Figure 9:
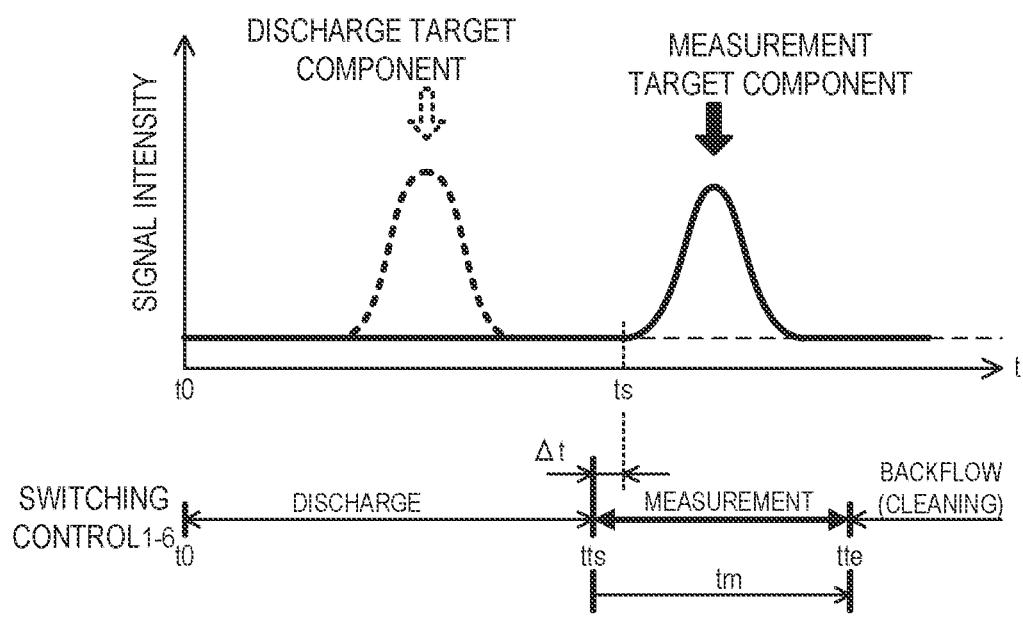
FIG. 9 is a diagram illustrating a concept of executing switching of a flow path in a case where the measurement mode, the discharge mode, and a backflow mode are included.

In a case where the backflow mode (cleaning mode) is executed in addition to the measurement mode and the discharge mode described above, for example, the backflow mode can be realized by control below. FIG. 9 is a diagram illustrating a concept of executing switching of a flow path in a case where the measurement mode, the discharge mode, and the backflow mode are included.

Switching between the discharge mode and the measurement mode is similar to that in the above description (for example, in the case of FIG. 6A), and description of similar portions will be omitted.

When an end time tte of a measurement period is reached, the control unit 20 detects this and switches the measurement mode to the backflow mode. By the above, the gas component detection device 10 can perform cleaning of the column 21 and the like together with measurement of a measurement target component and discharge of a discharge target component.

(Specific Configuration Example of Flow Path Switch)

Figure 10A:
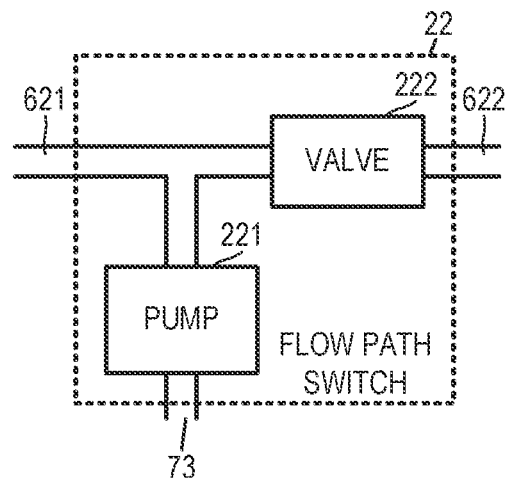
FIGS. 10A, 10B, and 10C are diagrams illustrating a configuration of a flow path switch.
Figure 10B:
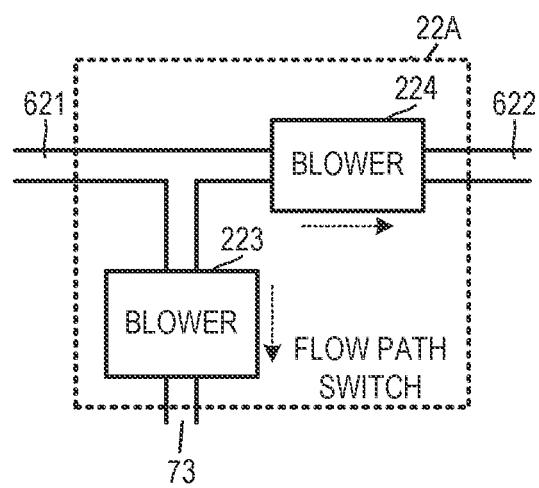
Figure 10C:
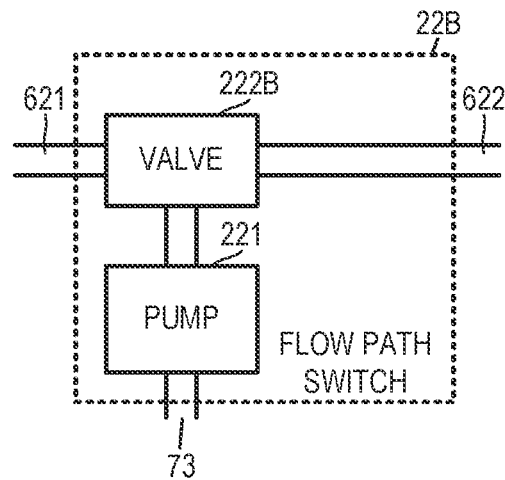

In order to execute the above-described flow path switching, the flow path switch has, for example, a configuration as illustrated in FIGS. 10A, 10B, and 10C. FIGS. 10A, 10B, and 10C are diagrams illustrating a configuration of the flow path switch.

The flow path switch 22 illustrated in FIG. 10A includes a pump 221 and a valve 222. The pump 221 is connected between the flow path 621 and the opening 73. The valve 222 is connected between the flow path 621 and the flow path 622.

In this configuration, in a case of the measurement mode, the pump 221 does not operate, and the valve 222 is opened. By the above, a measurement target component in gas to be detected is conveyed from the flow path 621 to the flow path 622 and sent into the sensor 23.

In a case of the discharge mode, the pump 221 operates and the valve 222 is shut off. By the above, a discharge target component in gas to be detected is conveyed from the flow path 621 to the opening 73 and sent out to the outside.

In a case of thee backflow mode, the pump 221 operates and the valve 222 is shut off. At this time, the pump 221 is controlled to convey gas in a direction opposite to that in the discharge mode. By the above, external gas is sucked from the opening 73, conveyed to the flow path 621, and sent into the column 21.

A flow path switch 22A illustrated in FIG. 10B includes a blower 223 and a blower 224. Each of the blower 223 and the blower 224 has a check valve structure. The blower 223 and the blower 224 convey gas only in one direction, and do not convey and block gas in a direction opposite to the conveying direction. The blower 223 is connected between the flow path 621 and the opening 73, and conveys gas from the flow path 621 toward the opening 73. The blower 224 is connected between the flow path 621 and the flow path 622, and conveys gas from the flow path 621 toward the flow path 622.

In this configuration, in a case of the measurement mode, the blower 223 is stopped and the blower 224 is operated. By the above, a measurement target component in gas to be detected is conveyed from the flow path 621 to the flow path 622 and sent into the sensor 23.

In a case of the discharge mode, the blower 223 is operated and the blower 224 is stopped. By the above, a discharge target component in gas to be detected is conveyed from the flow path 621 to the opening 73 and sent out to the outside.

Note that in a case where the backflow mode is executed, another blower is preferably connected in parallel to the blower 223 in the opposite direction. Then, the blower 223 and the blower 224 are preferably stopped, and the blower connected in parallel to the blower 223 is preferably operated.

A flow path switch 22B illustrated in FIG. 10C includes the pump 221 and a valve 222B. The valve 222B is connected to the flow path 621, the flow path 622, and the pump 221. The pump 221 is connected between the valve 222B and the opening 73.

In a case of the measurement mode, the valve 222B communicates between the flow path 621 and the flow path 622, and blocks a path between the flow path 621 and the pump 221 and the opening 73.

In a case of the discharge mode, the valve 222B switches to the discharge mode in which the flow path 621 is allowed to communicate with the pump 221 and the opening 73 and a path between the flow path 621 and the flow path 622 is blocked.

In a case of the backflow mode, that is, in a case where backflow cleaning of the column 21 is performed, the valve 222B allows the opening 73 and the pump 221 to communicate with the flow path 621, blocks a path between the opening 73 and the pump 221 and the flow path 622, and blocks a path between the flow path 621 and the flow path 622.

In a case of the forward flow mode, that is, in a case where forward flow cleaning of the sensor 23 is performed, the valve 222B allows the opening 73 and the pump 221 to communicate with the flow path 622, blocks a path between the opening 73 and the pump 221 and the flow path 621, and blocks a path between the flow path 621 and the flow path 622.

Furthermore, in a case where the backflow mode and the forward flow mode are simultaneously executed, that is, in a case where backflow cleaning of the column 21 and forward flow cleaning of the sensor 23 are performed, the valve 222B allows the opening 73 and the pump 221 to communicate with the flow path 621, and allows the opening 73 and the pump 221 to communicate with the flow path 622.

Note that, in this configuration, if the backflow mode and the forward flow mode are not performed, the pump 221 can be omitted.

Figure 11:
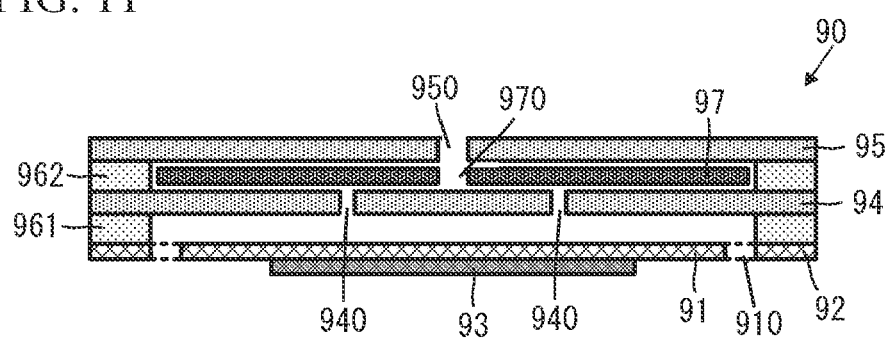
FIG. 11 is a side cross-sectional view illustrating an example of a configuration of a blower.

FIG. 11 is a side cross-sectional view illustrating an example of a configuration of a blower. As illustrated in FIG. 11, a blower 90 includes a diaphragm 91, a support 92, a piezoelectric element 93, a flat plate 94, a flat plate 95, a side wall member 961, a side wall member 962, and a valve membrane 97.

The diaphragm 91 is, for example, a flat plate having a circular shape in plan view. An outer periphery of the diaphragm 91 is supported by the support 92 so as to be able to vibrate. An opening 910 is provided between the diaphragm 91 and the support 92.

The piezoelectric element 93 is installed on the diaphragm 91. When drive voltage is applied to the piezoelectric element 93, a piezoelectric body of the piezoelectric element 93 is distorted. Then, due to this distortion, the diaphragm 91 bends and vibrates.

The flat plate 94 is arranged at a position away from the diaphragm 91. The vicinity of an outer edge of the flat plate 94 and the support 92 are joined using the side wall member 961 having an annular shape. A plurality of openings 940 are provided near the center of the flat plate 94.

The flat plate 95 is arranged at a position away from the flat plate 94. The vicinity of an outer edge of the flat plate 95 and the vicinity of an outer edge of the flat plate 94 are joined using the side wall member 962 having an annular shape. An opening 950 is provided near the center of the flat plate 95. The opening 950 does not overlap the opening 940 in plan view.

The valve membrane 97 is a flat membrane. An opening 970 is provided near the center of the valve membrane 97. The valve membrane 97 is arranged in a space surrounded by the flat plate 94, the flat plate 95, and the side wall member 962. In plan view, the opening 970 of the valve membrane 97 and the opening 950 of the flat plate 95 overlap.

With such a configuration, in the blower 90, pressure distribution in a space (pump chamber) surrounded by the diaphragm 91, the flat plate 94, and the side wall member 961 fluctuates due to vibration of the diaphragm 91, and gas can be conveyed. Here, when gas flows in from the opening 910, the gas is conveyed in a center direction of a pump chamber and passes through the opening 940. This gas moves the valve membrane 97 toward the flat plate 95 side, and the gas is sent out to the outside through the opening 970 and the opening 950. On the other hand, when gas flows in from the opening 950, the valve membrane 97 moves to the flat plate 94 side and abuts on the flat plate 94. By the above, the opening 940 is closed by the valve membrane 97. Thus, no gas is conveyed. With such a configuration, the blower 90 can realize conveyance of gas in one direction.

Then, by using the above-described configuration, the blower 90 becomes thin. Therefore, by employing the blower 90 for each of the blowers described above, the gas component detection device 10 can be downsized.

Figure 12:
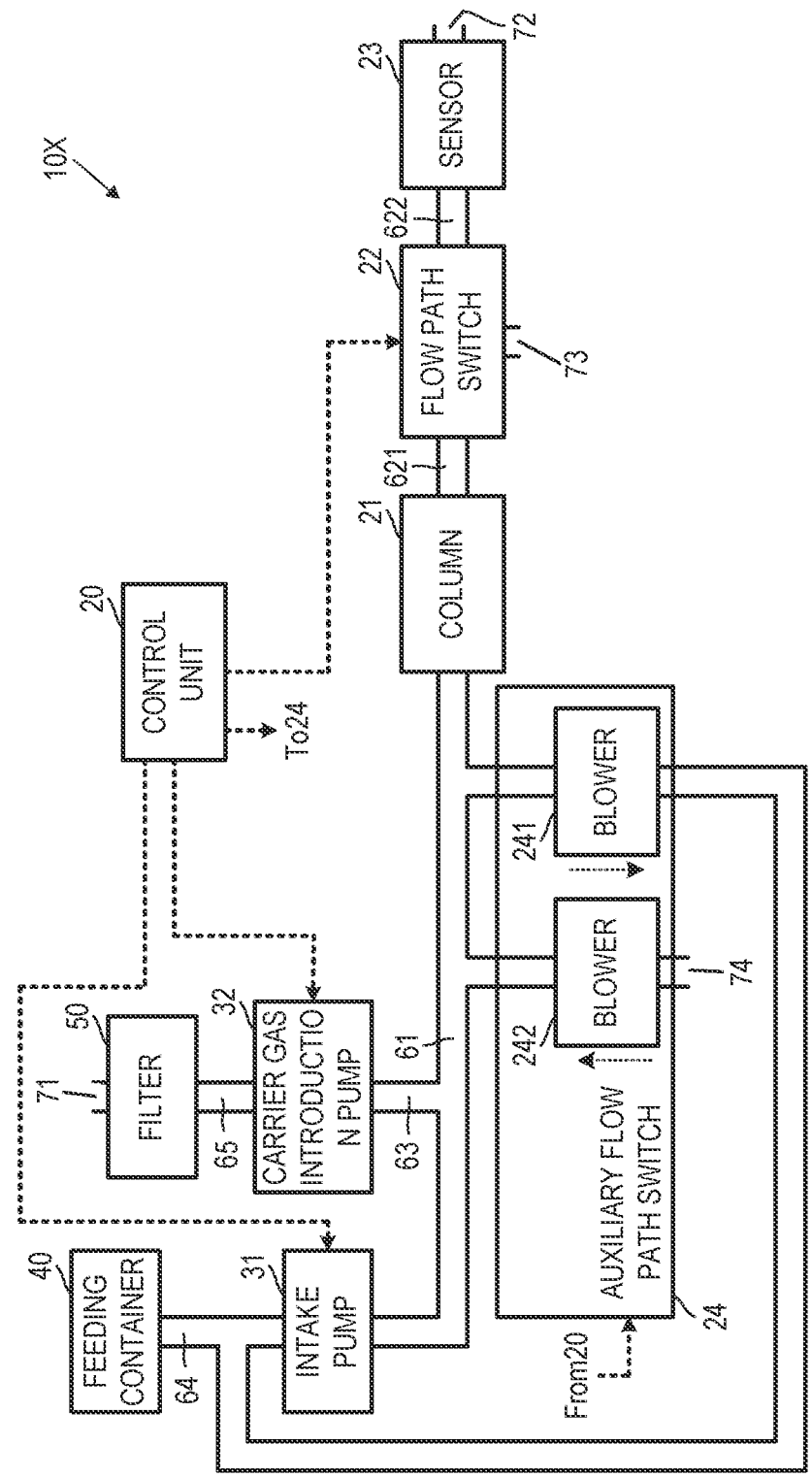
FIG. 12 is a diagram illustrating a configuration of the gas component detection device further including an auxiliary flow path switch.

Note that an auxiliary flow path switch may be added to the above configuration. FIG. 12 is a diagram illustrating a configuration of the gas component detection device further including the auxiliary flow path switch. As illustrated in FIG. 12, a gas component detection device 10X includes an auxiliary flow path switch 24. The auxiliary flow path switch 24 includes a blower 241 and a blower 242.

The blower 241 is connected between the flow path 61 communicating with an inlet of the column 21 and the flow path 64. The blower 241 conveys gas in one direction from the flow path 61 to the flow path 64. The blower 241 can be used, for example, in the above-described backflow mode, that is, backflow cleaning of the column 21 or backflow cleaning of the column 21 and the feeding container 40.

The blower 242 is connected between the flow path 61 and the opening 74. The blower 242 conveys gas in one direction from the opening 74 to the flow path 61. The blower 242 can be used, for example, for forward flow cleaning of the column 21.

Second Embodiment

Figure 13:
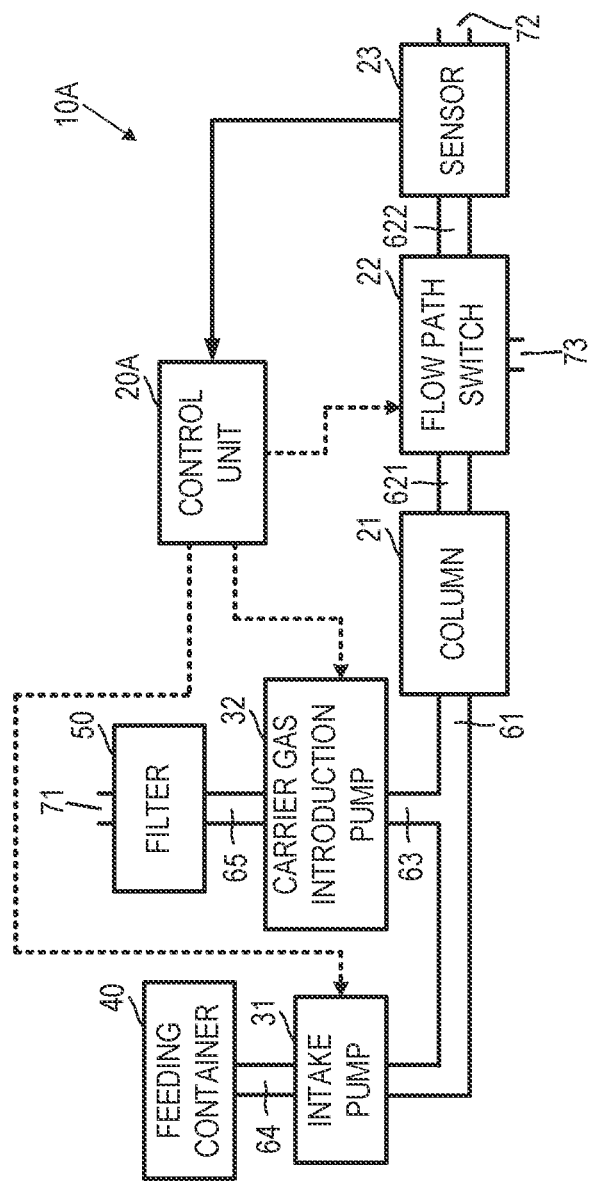
FIG. 13 is a diagram illustrating a configuration of the gas component detection device according to a second embodiment.

The gas component detection device according to a second embodiment of the present invention will be described with reference to the drawings. FIG. 13 is a diagram illustrating a configuration of the gas component detection device according to the second embodiment.

As illustrated in FIG. 13, a gas component detection device 10A according to the second embodiment is different from the gas component detection device 10 according to the first embodiment in a start trigger of the measurement mode. The other configurations of the gas component detection device 10A are similar to those of the gas component detection device 10, and description of similar portions will be omitted.

The gas component detection device 10A includes a control unit 20A. The control unit 20A acquires a measurement signal output from the sensor 23. The control unit 20A detects signal intensity P from the measurement signal at a predetermined sampling period. The control unit 20A sequentially calculates a time change rate $\Delta P/\Delta tP$ of the signal intensity P. When the time change rate $\Delta P/\Delta tP$ of the signal intensity P is equal to or more than a threshold TH, the control unit 20A executes the measurement mode.

As described above, the control unit 20A can switch a flow path using not only time from start of control but also the time change rate $\Delta P/\Delta tP$ of the signal intensity P.

Note that the above-described configurations and control can be appropriately combined, and actions and effects according to the combinations can be exhibited.

10, 10A, 10X gas component detection device
20 control unit
20A control unit
21 column
22, 22A, 22B flow path switch
23 sensor
24 auxiliary flow path switch
31 intake pump
32 carrier gas introduction pump
40 feeding container
50 filter
61, 621, 622, 63, 64, 65 flow path
71, 72, 73, 74 opening
221 pump
222 valve
223, 224, 241, 242, 90 blower
91 diaphragm
92 support
93 piezoelectric element
94, 95 flat plate
97 valve membrane
910, 940, 950, 970 opening
961, 962 side wall member

The invention claimed is:

1. A gas component detection device comprising:
a column configured to separate a component of gas to be detected;
a sensor connected to a downstream side of the column and configured to detect the component of the gas to be detected;
a downstream flow path connecting the column and the sensor; and
a flow path switch arranged in the downstream flow path, wherein:
the flow path switch configured to switch between and execute a measurement mode in which the gas to be detected discharged from the column is caused to flow into the sensor, a discharge mode in which the gas to be detected discharged from the column is discharged to outside, and a backflow mode in which an outside gas is caused to flow back from the downstream flow path in a manner passing through the column so that the column is cleaned, the flow path switch includes a valve or a blower having a straightening function, and the gas to be detected is released to outside and the downstream flow path of the gas to be detected to the sensor is blocked as the valve or the blower is controlled by a control unit at the discharge mode.

2. The gas component detection device according to claim 1, further comprising a carrier gas introduction pump configured to introduce carrier gas for conveying the gas to be detected into the column, wherein the flow path switch configured to start the measurement mode with reference to a carrier gas introduction start time by the carrier gas introduction pump.

3. The gas component detection device according to claim 1, further comprising a carrier gas introduction pump configured to introduce carrier gas for conveying the gas to be detected into the column, wherein the flow path switch configured to start the discharge mode with reference to a carrier gas introduction start time by the carrier gas introduction pump.

4. The gas component detection device according to claim 3, wherein the flow path switch configured to start the measurement mode with reference to a change in output of the sensor.

5. The gas component detection device according to claim 1, wherein the sensor is a semiconductor sensor.

6. The gas component detection device according to claim 1, wherein the flow path switch is connected between the column and the sensor.

7. The gas component detection device according to claim 1, further comprising:

an intake pump configured to send the gas to be detected to the column; and a carrier gas introduction pump configured to introduce a carrier gas to the column, wherein:

a flow path which communicates with the column and the intake pump and a flow path which communicates with the column and the carrier gas introduction pump have different parts individually; and the flow path which communicates with the column and the intake pump and the flow path which communicates with the column and the carrier gas introduction pump are connected to each other.

8. The gas component detection device according to claim 7, further comprising:

a filter which communicates with the carrier gas introduction pump.

9. The gas component detection device according to claim 7, further comprising:

a feeding container which stores the gas to be detected and is detachable to the intake pump.

10. The gas component detection device according to claim 7, wherein:

the intake pump feeds the gas to be detected;

the carrier gas introduction pump introduces the carrier gas after feeding the gas to be detected; and the gas to be detected is mixed with the carrier gas and inserted into the column.

11. The gas component detection device according to claim 7, further comprising:

an auxiliary flow path switch which communicates with an upstream of the column and is used to the backflow mode.

12. The gas component detection device according to claim 1, wherein the flow path switch is configured to switch between and execute the measurement mode, the discharge mode, the backflow mode, and a cleaning mode in which the outside gas is configured to flow back through the column and flow through the sensor.

13. A gas component detection device comprising:

a column configured to separate a component of gas to be detected;

a sensor connected to a downstream side of the column and configured to detect the component of the gas to be detected;

a downstream flow path connecting the column and the sensor; and a flow path switch arranged in the downstream flow path, wherein:

the flow path switch is configured to switch between and execute a measurement mode in which the gas to be detected discharged from the column is caused to flow into the sensor, a discharge mode in which the gas to be detected discharged from the column is discharged to outside, and a backflow mode in which an outside gas is caused to flow back from the downstream flow path in a manner passing through the column so that the column is cleaned;

the flow path switch includes a valve or a blower having a straightening function; and the discharge mode and the backflow mode are switched as the valve or the blower is controlled by a control unit.

14. The gas component detection device according to claim 13, wherein the flow path switch is connected between the column and the sensor.

15. The gas component detection device according to claim 13, further comprising:

an intake pump configured to send the gas to be detected to the column; and a carrier gas introduction pump configured to introduce a carrier gas to the column, wherein:

a flow path which communicates with the column and the intake pump and a flow path which communicates with the column and the carrier gas introduction pump have different parts individually; and the flow path which communicates with the column and the intake pump and the flow path which communicates with the column and the carrier gas introduction pump are connected to each other.

16. The gas component detection device according to claim 13, wherein the flow path switch configured to switch between and execute the measurement mode, the discharge mode, the backflow mode, and a cleaning mode in which the outside gas is configured to flow back through the column and flow through the sensor.

17. The gas component detection device according to claim 15, further comprising:

a filter which communicates with the carrier gas introduction pump.

18. The gas component detection device according to claim 15, further comprising:

a feeding container which stores the gas to be detected and is detachable to the intake pump.

19. The gas component detection device according to claim 15, wherein:

the intake pump feeds the gas to be detected;

the carrier gas introduction pump introduces the carrier gas after feeding the gas to be detected; and the gas to be detected is mixed with the carrier gas and inserted into the column.

20. The gas component detection device according to claim 15, further comprising:

an auxiliary flow path switch which communicates with an upstream of the column and is used to the backflow mode.

* * * * *